J. T. SHANTON.
Process of Treating Bran.
No. 208,642. Patented Oct. 1, 1878.
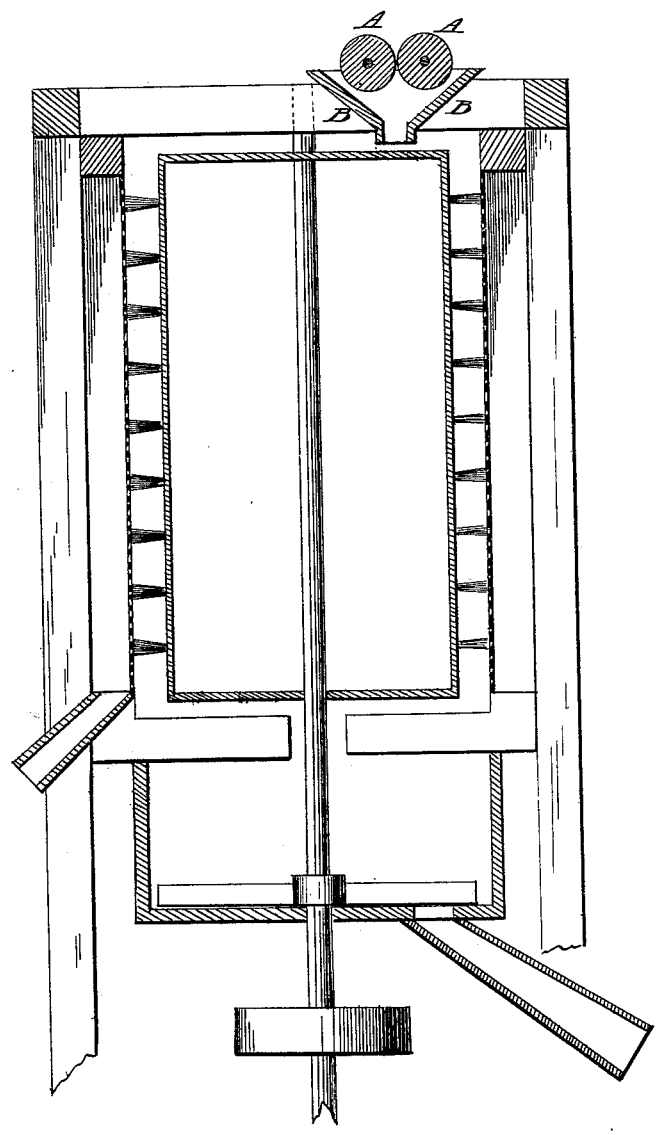

UNITED STATES PATENT OFFICE.

JAMES T. SHANTON, OF ST. LOUIS, MISSOURI, ASSIGNOR OF ONE-HALF HIS RIGHT TO ROBERT L. DOWNTON, OF SAME PLACE.

IMPROVEMENT IN PROCESSES OF TREATING BRAN.

Specification forming part of Letters Patent No. 208,642, dated October 1, 1878; application filed April 18, 1878.

*To all whom it may concern:*

Be it known that I, JAMES T. SHANTON, of the city and county of St. Louis, and State of Missouri, have invented certain new and useful Improvements in the Process of Treating Bran in the Manufacture of Flour; and I do hereby declare the following to be a full, clear, and exact description of the same, which will enable others skilled in the art to which it appertains to use the same.

It is well known to millers that a portion of the flour contained in the wheat-berry adheres to the bran after grinding, the glutinous cells not being thoroughly detached, and which has heretofore been subjected to regrinding and again rebolted, or subjected directly to the action of bran-dusters; but, in regrinding the bran for the purpose of separating the flour therefrom, the bran would be ground so fine as not to be readily separated from the flour; or, in the case of subjecting the bran directly to the action of the bran-dusters, the flour could not readily be separated from the bran, thus necessarily leaving some portions of the flour still adhering to the bran, resulting, in the first instance, in an inferior grade of flour, and, in the second instance, in a decreased percentage of flour made from the same amount of wheat.

My invention is intended to obviate the above-described defects, and at the same time produce a better grade of flour and an increase in the percentage of flour made from the same amount of wheat; and to this end the invention consists in subjecting the bran, after the superfine flour and middlings have been separated therefrom, to the action of rolls, by passing the bran between the rolls for the purpose of breaking the glutinous cells adhering to the bran, and subsequently subjecting it to the action of a bran-duster, by which the flour is more fully and easily separated therefrom.

I will now describe briefly my process of treating the bran, referring for illustration to the accompanying drawing, in which the figure represents a sectional view of the machines necessary in carrying out my improved process.

The bran, after the separation therefrom of the superfine or starchy flour and middlings, is passed between the rolls A, which break the glutinous cells adhering to the bran, after which the material is passed through the bran-duster B, by which the flour is more fully and easily separated from the bran. The action of the rolls upon the bran tends to compress or cake it, and at the same time break up the glutinous cells or flour adhering to the bran, whereby the flour is more easily and quickly separated from the bran by the subsequent light rubbing action it is subjected to from the bran-duster, without comminuting the bran so as to allow some portions thereof to pass through with the flour, as is the case when the bran is directly subjected to the action of bran-dusters or to the action of burrs on coming from the rolls.

I claim as my invention—

The herein-described process of treating bran in the manufacture of flour, consisting in subjecting the bran to the action of rolls by passing it between them for the purpose of breaking the glutinous cells adhering to the bran, and subsequently subjecting it to the action of a bran-duster, substantially as specified.

JAMES T. SHANTON.

Witnesses:
 TOM MILLER, Jr.,
 T. HENRY MORGAN.